United States Patent [19]

Campbell, Jr.

[11] 4,362,506
[45] Dec. 7, 1982

[54] SINGLE LOCATION INSULATOR LOCKING DEVICE

[75] Inventor: Frank Campbell, Jr., Houston, Tex.

[73] Assignee: Fulbright & Jaworski, Houston, Tex.

[21] Appl. No.: 253,463

[22] Filed: Apr. 13, 1981

[51] Int. Cl.³ .................... F27D 3/02; D03D 49/26
[52] U.S. Cl. .................................... 432/234; 138/149
[58] Field of Search .......................... 432/233, 234; 248/226.5, 316 D; 52/724, 725, 728; 138/149

[56] References Cited

U.S. PATENT DOCUMENTS

| | | | |
|---|---|---|---|
| 3,451,661 | 6/1969 | Barker | 432/234 |
| 3,453,718 | 7/1969 | Bates | 138/149 |
| 3,488,040 | 1/1970 | Dickson | 432/234 |
| 3,781,167 | 12/1973 | Ahonen | 432/234 |
| 3,881,864 | 5/1975 | Nicol | 432/234 |
| 3,941,160 | 3/1976 | Campbell, Jr. | 138/178 |
| 4,182,609 | 1/1980 | Hovis et al. | 432/234 |
| 4,228,826 | 10/1980 | Campbell, Jr. | 138/149 |

FOREIGN PATENT DOCUMENTS 2296831 7/1976 France .................... 432/234

OTHER PUBLICATIONS

Cameron Therm-A-Rail System, pp. ii, 7, 14, released Mar. 1981 by the Cameron Iron Works, Inc.

Primary Examiner—John J. Camby
Attorney, Agent, or Firm—Fulbright & Jaworski

[57] ABSTRACT

The device for closely securing two insulator segments around a support member includes a resilient brace secured to and connecting the spaced apart insulator segments, a pair of converging upper locking surfaces and contiguous diverging lower surfaces on the insulator segments. A locking bar having a top and a pair of converging sides is conformingly inserted within the brace and upper locking surfaces in order to mechanically secure the insulator segments around the support member. A refractory mortar is applied to the interior of the locking plug and the diverging lower surfaces in order to protect the locking plug from the furnace heat. The arrangement permits the insulator segments to be locked at a single point around the support member.

6 Claims, 10 Drawing Figures

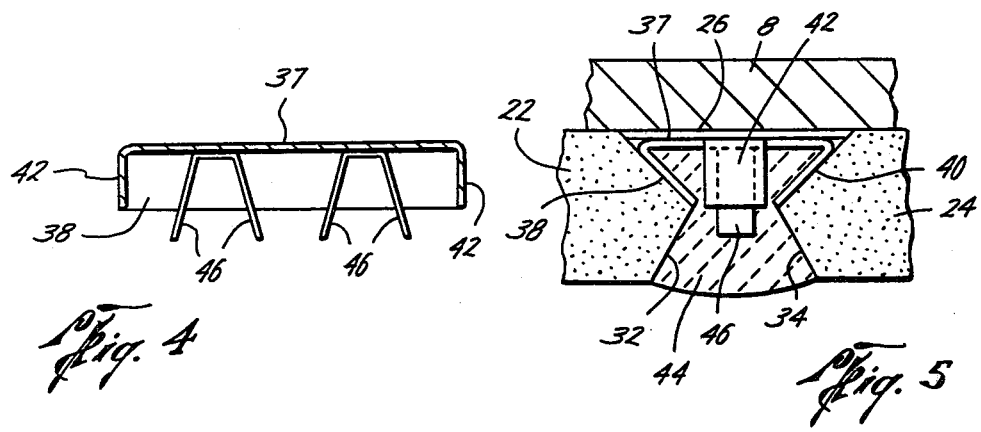
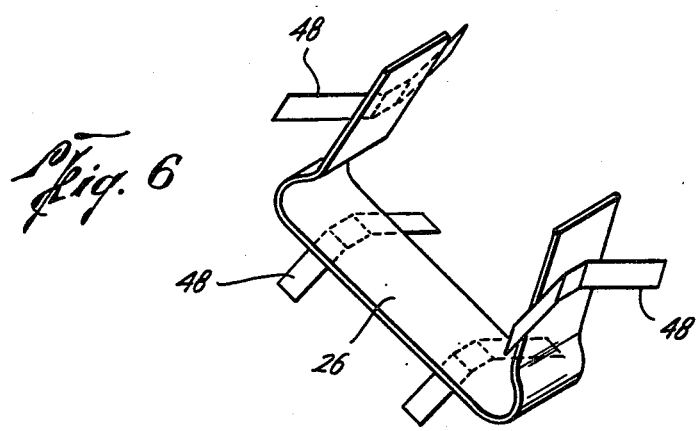
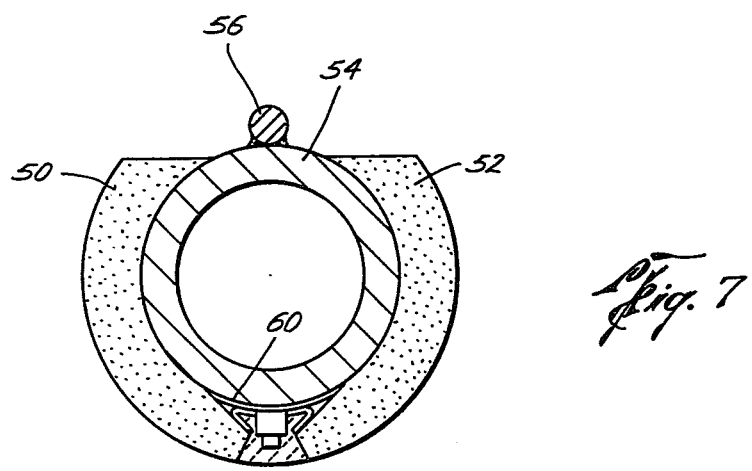

SINGLE LOCATION INSULATOR LOCKING DEVICE

BACKGROUND OF THE INVENTION

In a metallurgical reheat furnace, metal workpieces are pushed or walked through the furnace and are supported by a series of skid pipes. In a pusher furnace, a complex network of vertical and horizontal water-cooled pipes supports the skid pipes over which the pieces are pushed. Because the heat flow from the furnace into the watercooled pipe structure is forever lost, it is essential to maintain an effective insulation around the pipe network. The down time for a furnace undergoing repairs is a recurring and expensive operation; therefore, it is most desirable to have an insulator which can quickly and easily be applied around the skid pipe, cross pipe or vertical pipe. Moreover, it is desirable that the insulator be secured to the support member without requiring complicated technology, time-consuming welding of studs to the pipe and the tedious and time-consuming effort of aligning recesses in insulators with the welded pipe studs. Finally, it is essential that the insulator remain on the support member as long as possible.

SUMMARY OF THE PRESENT INVENTION

The present device relates to an apparatus for securing a pair of insulator segments around a support member (as in the case of a cross pipe or vertical pipe) or even partially around the support member (as in the case of a skid pipe). The present invention permits the operator easily to apply the insulator segments around the particular support member and then to lock the insulator segments at a single point conformingly around the support member.

Briefly, a pair of insulator segments surrounding, or partially surrounding, the support member are connected to one another by a resilient brace so that they are in spaced apart relationship to one another. The resilient brace is secured to each insulator segment by a series of prongs which are embedded in the insulator segments. The spaced apart insulator segments can be applied around the support member by bending the resilient brace sufficiently thereby permitting the insulator segments to be flexed away from one another in order to receive the support member between the two segments.

Each insulator segment has an upper locking surface convergingly projecting toward one another from the brace. Each upper locking surface becomes a diverging lower surface which continues to the exterior of the insulator segments. A locking plug, having a top and a pair of converging sides, is slidingly and conformingly received by the brace and pair of upper locking surfaces respectively. The locking plug provides a mechanical means to urge the upper locking surfaces away from one another thereby insuring that the insulator segments are conformingly secured to the support member. The interior of the locking plug may be equipped with a plurality of tines which are exposed to the operator through the diverging lower surfaces. The operator then fills the volume around the tines and the diverging lower surfaces with a suitable refractory mortar in order to protect the locking plug from the effects of the hot, corrosive furnace gases.

The present invention, therefore, permits the operator to apply an insulator to a skid pipe, cross pipe or vertical pipe by applying the locking plug to the spaced apart insulator segments and resilient brace thus eliminating the need for welded studs and recesses, the need for hinges at a second point, the need for welding wire mesh within the insulator to the support member or for affixing the two insulator segments at any second location whatsoever.

A series of insulator segment pairs are secured to the particular support member until the desired length of the support member is covered.

It is therefore an object of the present invention to provide a single location locking device whereby an insulator can be directly applied around all or part of the support members.

Another object of the present invention is to provide a single location locking device in which the insulator segments are mechanically secured around and urged into conforming position around the support member.

A further object of the present invention is to provide a locking device in which the insulator segments can be flexed away from one another so that the support members can be received directly between the insulator segments.

Yet a further object of the present invention is to provide a device for locking a pair of insulator segments around a pipe without the need for welding of any kind, the alignment of recesses with pipe studs or the use of complicated technology.

Still another object of the present invention is to provide a single location locking device for a pair of insulator segments, which locking device is simple to manufacture, easy to apply and is protected from the deleterious effects of the hot, corrosive furnace gases.

These and other objects of the present invention will become even more apparent when read in light of the specification, drawings and claims appended hereto.

BRIEF DESCRIPTION OF THE DRAWINGS

FIG. 4 is a sectional elevational view taken along lines 4—4 of FIG. 1 showing the locking plug, the tabs at either end of the locking plug, and a plurality of projecting tines therein.

FIG. 5 is a detailed view showing the relationship of the spaced apart upper locking surfaces, the resilient brace, the diverging lower surfaces and the inserted locking plug filled with the refractory mortar.

FIG. 6 is an isometric view of the resilient brace removed from the insulator segments and further showing the securing prongs on the brace.

FIG. 7 is a cross sectional view of another embodiment of the present device suitable for use with a round skid pipe.

BRIEF DESCRIPTION OF THE PREFERRED EMBODIMENT

Figure 1:
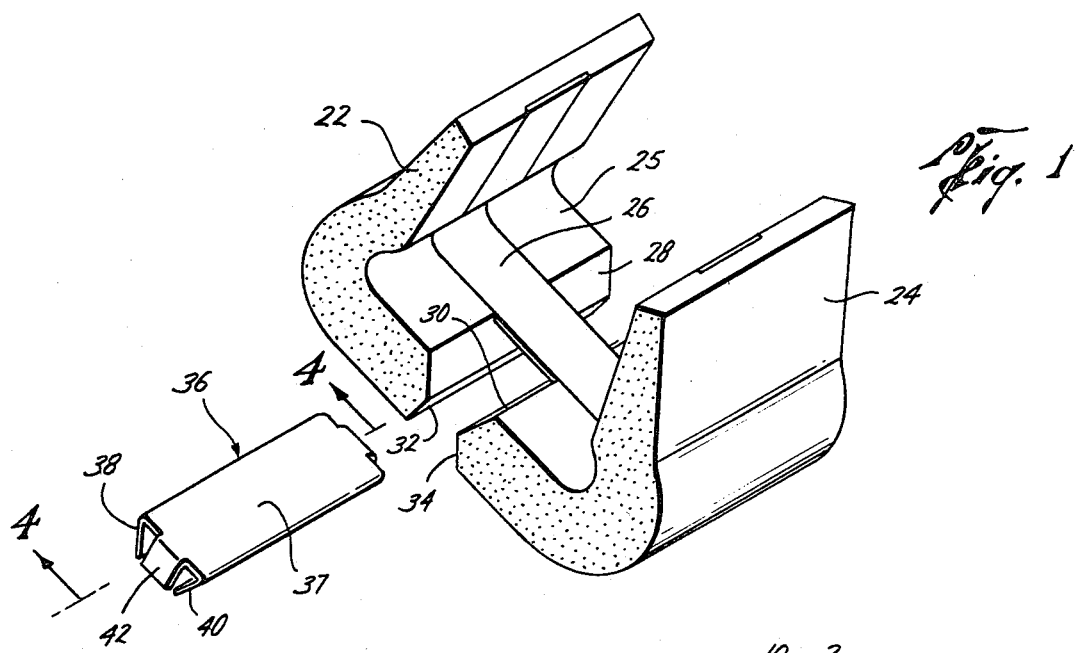
FIG. 1 is an exploded view in perspective of the present device in an embodiment suitable for a truncated triangular skid pipe.
Figure 3:
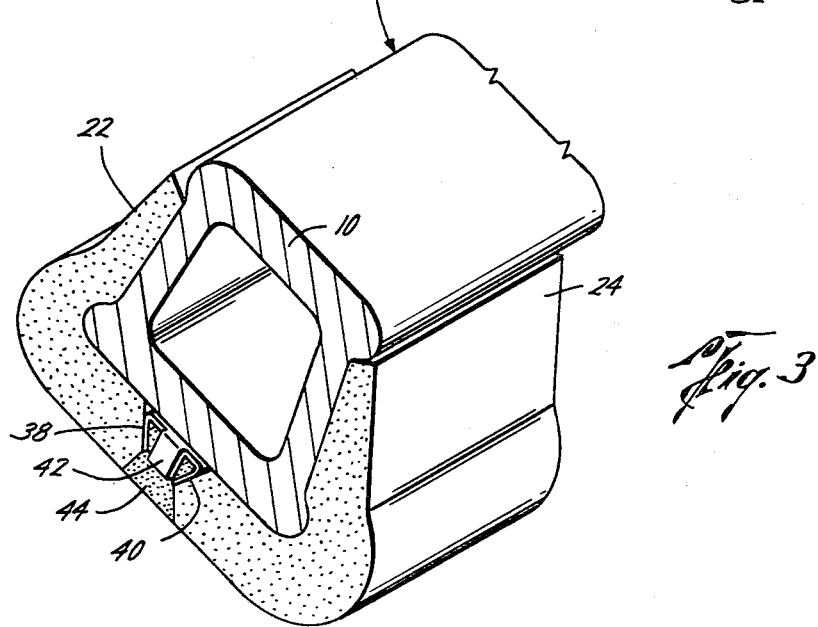
FIG. 3 is an isometric view of the embodiment shown in FIG. 2 after the insulator segments have been applied to the support member, the locking plug has been slidably received between the converging upper locking surfaces and the refractory mortar has been applied to the diverging lower surfaces and the interior of the locking plug.

The present invention is suitable for use with a pair of insulator segments conforming to a number of shapes of support members. The support members can be cross pipes, vertical pipes or even skid pipes. As shown in FIG. 1, a pair of insulator segments 22, 24 having interior surfaces 25 are spaced apart from one another so that after they have been applied to the support member 10 as shown in FIG. 3, they provide an effective insulator for the support member. FIG. 1 shows a resilient brace 26 which connects the insulator segments 22, 24 and maintains them in their spaced apart relationship. The brace 26 is fully shown in FIG. 6 to include a plurality of prongs 48 which are embedded in the insulator segments in order to secure the segments 22, 24 to the brace 26. It is understood by those skilled in the art, that the resilient brace 26 will take various shapes in order to conform generally with the particular shape of the insulator segments and the support member. For example, the resilient brace 60 in FIG. 7 is arcuate in order to conform with the insulator segments 50, 52 and the round support member 54.

Figure 2:
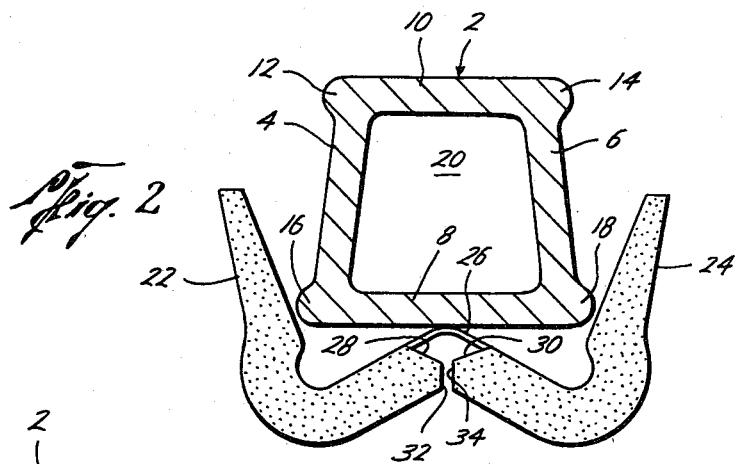
FIG. 2 is a view in cross section showing the embodiment of FIG. 1 being applied to the support member.

A pair of upper locking surfaces 28, 30 are in spaced apart relationship to one another as shown in FIGS. 1 and 2. The upper locking surfaces 28, 30 extend from the brace 26 and converge toward one another in a direction away from the brace. A pair of lower surfaces 32, 34 are in spaced apart relationship to one another and diverge from one another as they extend from the upper locking surfaces 28, 30 respectively.

A locking plug 36 has a top 37 and a pair of converging sides 38, 40. As shown in FIG. 5, the converging sides leave an exposed volume therein which communicates with the diverging lower surfaces 32, 34. The top 37 and converging sides 38, 40 of the locking plug 36 are slidingly received within the brace 26 and the upper locking surfaces 28, 30 respectively. A tab 42 can be placed on either or both ends of the locking plug 36 in order to facilitate the sliding of the locking plug 36 therein. When the locking plug 36 is in proper position, the sides 38, 40 abut the upper locking surfaces 28, 30 respectively thereby urging them outwardly from one another. The result is that the insulator segments 22, 24 are placed in conforming configuration around the support member 10 and are mechanically locked at a single location in this configuration by the interaction of the locking plug 36 with the brace 26 and upper locking surfaces 28, 30. In operation, the embodiment of FIG. 1 is applied to the particular support member 10 as shown in FIG. 2. It is understood by those skilled in the art that sufficient clearance between the insulator segments 22, 24 with the nodes 16, 18 of the support member 10 is necessary in order to permit the insulator segments to be applied around the support member 10. For example, the nodes 16, 18 can be reduced, or a void can be left between the base 8 of the support member 10 and the insulator segments so that the geometry of the connected insulator segments 22, 24 permits application to the support member 10. The resulting configuration would be analogous to, but not the same as, the embodiment of FIG. 10.

After the insulator segments 22, 24 are applied to the support member 10, the locking plug is inserted as shown in FIG. 3. Then a suitable insulator filler such as a refractory mortar 44 is applied into the volume between the converging sides 38, 40 and within the diverging lower surfaces 32, 34 so that the prongs 46 support the refractory mortar 44 after the mortar hardens. Thus, the locking plug 36 is effectively shielded from the hot corrosive gases of the furnace.

FIG. 5 shows an expanded view of the refractory mortar 44 effectively filling the volume between the converging sides 38, 40, the top 37 and the diverging lower surfaces 32, 34.

FIG. 7 shows the present invention when applied to a more conventional round skid pipe 54 having a skid 56 on its top. The arcuate insulator segments 50, 52 and the arcuate resilient brace 60 accommodate the round pipe as a support member 54.

Figure 8:
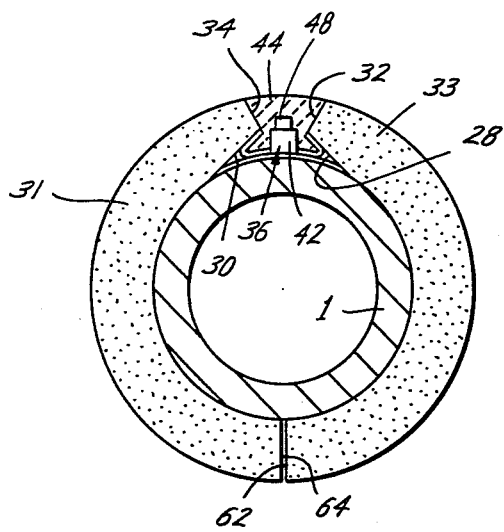
FIG. 8 is a cross sectional view of yet another embodiment of the present device for use with a round cross or vertical support member in which the single location locking device is situated on top of the support member.

The present invention can also be used with insulator segments which form a complete covering of the support member as in the case of a cross pipe or vertical pipe. For example, FIG. 8 shows a round support member 1 covered by a pair of arcuate insulator segments 31, 33. The upper locking surfaces 28, 30 perform the same function as previously described, as do the locking plug 36 and the diverging lower surfaces 32, 34. The single point locking device is located on top of the support member 1 in this configuration because the margins 62, 64 would permit the migration of slag therein if they were allowed to be on top. The mortar 44, however, reduces this problem as shown in FIG. 8.

Figure 9:
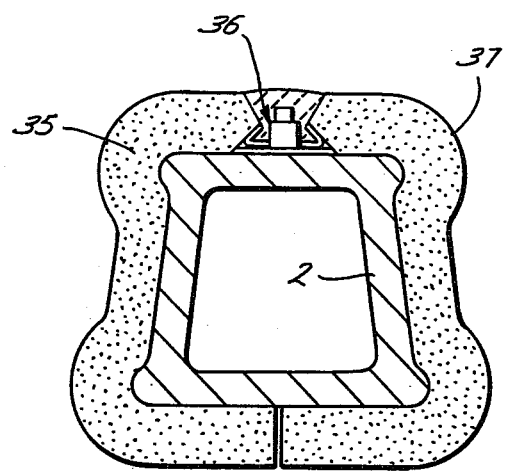
FIG. 9 is a view in cross section of yet another embodiment of the present device suitable for use with a truncated triangular cross or vertical support member in which the single location locking device is situated on top of the support member.
Figure 10:
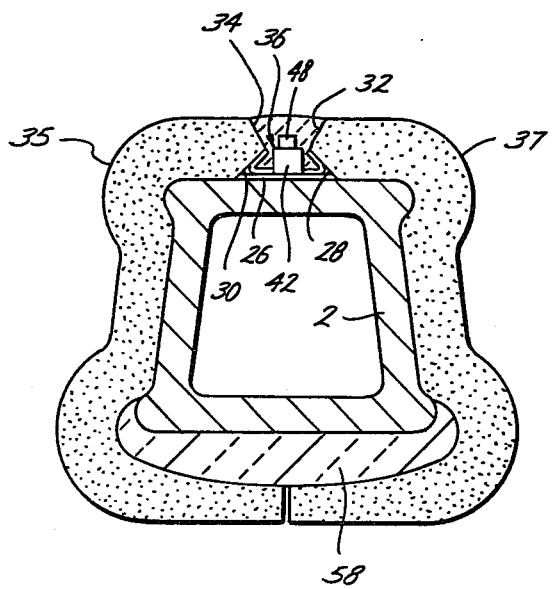
FIG. 10 is a modification of the embodiment of FIG. 9 in which a void is located between the base of the support member and the insulator segments.

FIGS. 9 and 10 show insulator segments 35, 37 for use with a support member 2 used as a cross pipe or a vertical pipe in the same manner as the embodiment of FIG. 8. Again, the locking plug 36 is located on top of the support member 2 for the same reasons as described for FIG. 8. In FIG. 10 a void 58 can be left vacant or filled with an additional insulator if desired. Furthermore, if this embodiment were locked from the bottom instead of at the top, the void 58 would render the insulator segments 35, 37 easier to apply around the support member 2.

Those skilled in the art will realize that the resilient brace 26 preferably is exposed to the interior surface 25 of the insulator segments 22, 24 so that the heat imparted to the brace 26 from the furnace is easily transferred to the support member 2 having a water coolant flowing through the passageway 20. Those skilled in the art will also realize that the resilient metallic locking member 36, when urged against the upper locking surfaces 28, 30 will simultaneously lock the insulator segments around the support member 10 while at the same time urging them into close conformity therewith.

In all embodiments shown, the present invention permits the insulator segments to be locked around the particular support member by applying a single locking plug 36 to a single location between the insulator segments. The insulator segments, therefore, can be applied anywhere along the support structure without the use of additional support structure and without the necessity to apply the insulator segments to a narrow, specially constructed portion of the support member and thereafter sliding the insulator segments along the support member into proper position.

The present invention, therefore, as described, illustrated and claimed, fully supports and meets the objects of the invention. Although a preferred embodiment has been described and claimed, it is understood that numerous modifications, amendments and alterations of structure will occur which fall clearly within both the spirit and the scope of the specification, drawings, and claims herein.

What is claimed is:

1. A combination of a releasably securable, self-supporting insulator covering at least a portion of the exterior of a pipe comprising:
   (a) A pair of spaced-apart, opposed insulator segments;
   (b) Each segment including an interior surface substantially conforming to a portion of the exterior of the pipe, said interior surface terminating at one end in a locking surface;
   (c) The locking surfaces of the spaced-apart, opposed insulator segments converging in a direction away from the pipe;
   (d) An elongated, resilient brace secured to and transversely connecting the spaced-apart insulator segments and maintaining said insulator segments in spaced-apart relationship; and
   (e) A single means located within the spaced-apart, opposed locking surfaces and the transverse resilient brace to lock the upper locking surfaces apart from one another and to urge the interior surfaces of the insulator segments into intimate contact with at least a portion of the exterior of the pipe so that the insulator is secured around said pipe.

2. The device of claim 1 wherein the brace is exposed to the interior surfaces of the insulator segments and the pipe to enhance the heat flow from the brace into the pipe.

3. The device of claim 1 wherein the means (e) is a removable elongated locking plug having a top and a pair of converging sides which conformingly abut the brace and converging upper locking surfaces respectively, to lock the insulator segments at a single location around the pipe.

4. The device of claim 3 wherein a plurality of tines are disposed between the top and the converging sides of the locking plug.

5. The device of claim 4 wherein the locking plug includes an end with a tab to facilitate the sliding of the locking plug between the brace and converging upper locking surfaces.

6. The device of claim 4 wherein the area between the top, sides and around the tines is substantially covered with an insulator filler.

* * * * *

UNITED STATES PATENT AND TRADEMARK OFFICE
CERTIFICATE OF CORRECTION

PATENT NO. : 4,362,506

DATED : December 7, 1982

INVENTOR(S) : Frank Campbell, Jr.

It is certified that error appears in the above-identified patent and that said Letters Patent is hereby corrected as shown below:

On the title page delete "/73/ Assignee: Fulbright & Jaworski, Houston, Tex."

Signed and Sealed this

Twenty-first Day of February 1984

[SEAL]

Attest:

GERALD J. MOSSINGHOFF

Attesting Officer     Commissioner of Patents and Trademarks